United States Patent [19]

Yasukawa et al.

[11] Patent Number: 4,918,481
[45] Date of Patent: Apr. 17, 1990

[54] CAMERA CAPABLE OF BRACKETING EXPOSURE

[75] Inventors: Seiichi Yasukawa; Takashi Saegusa, both of Kawasaki; Tsutomu Wakabayashi, Tokyo, all of Japan

[73] Assignee: Nikon Corporation, Tokyo, Japan

[21] Appl. No.: 354,808

[22] Filed: May 22, 1989

[30] Foreign Application Priority Data

May 26, 1988 [JP] Japan .................. 63-129031

[51] Int. Cl.$^4$ .............................................. G03B 7/00
[52] U.S. Cl. ................................ 354/410; 354/412; 354/411
[58] Field of Search ............... 354/410, 412, 214, 217, 354/173.1, 173.11

[56] References Cited

U.S. PATENT DOCUMENTS 4,734,727  3/1988  Takemae .......................... 354/412

Primary Examiner—Michael L. Gellner
Assistant Examiner—Cassandra C. Spyrou
Attorney, Agent, or Firm—Shapiro and Shapiro

[57] ABSTRACT

A camera capable of restarting the bracketing exposure mode even after all the frames of a film have been exposed during the bracketing exposure mode. An output derived from detector for detecting the trailing end of a film is delivered to controller which controls the arithmetic operation for obtaining an optimum exposure value as well as the bracketing exposure so that in response to the above-stated output, the controller inhibits the shutter release after the end of the film, but maintains the bracketing exposure mode. Furthermore, the remaining exposures of a predetermined number of exposures in the bracketing exposure mode are cancelled at the end of the film.

13 Claims, 3 Drawing Sheets

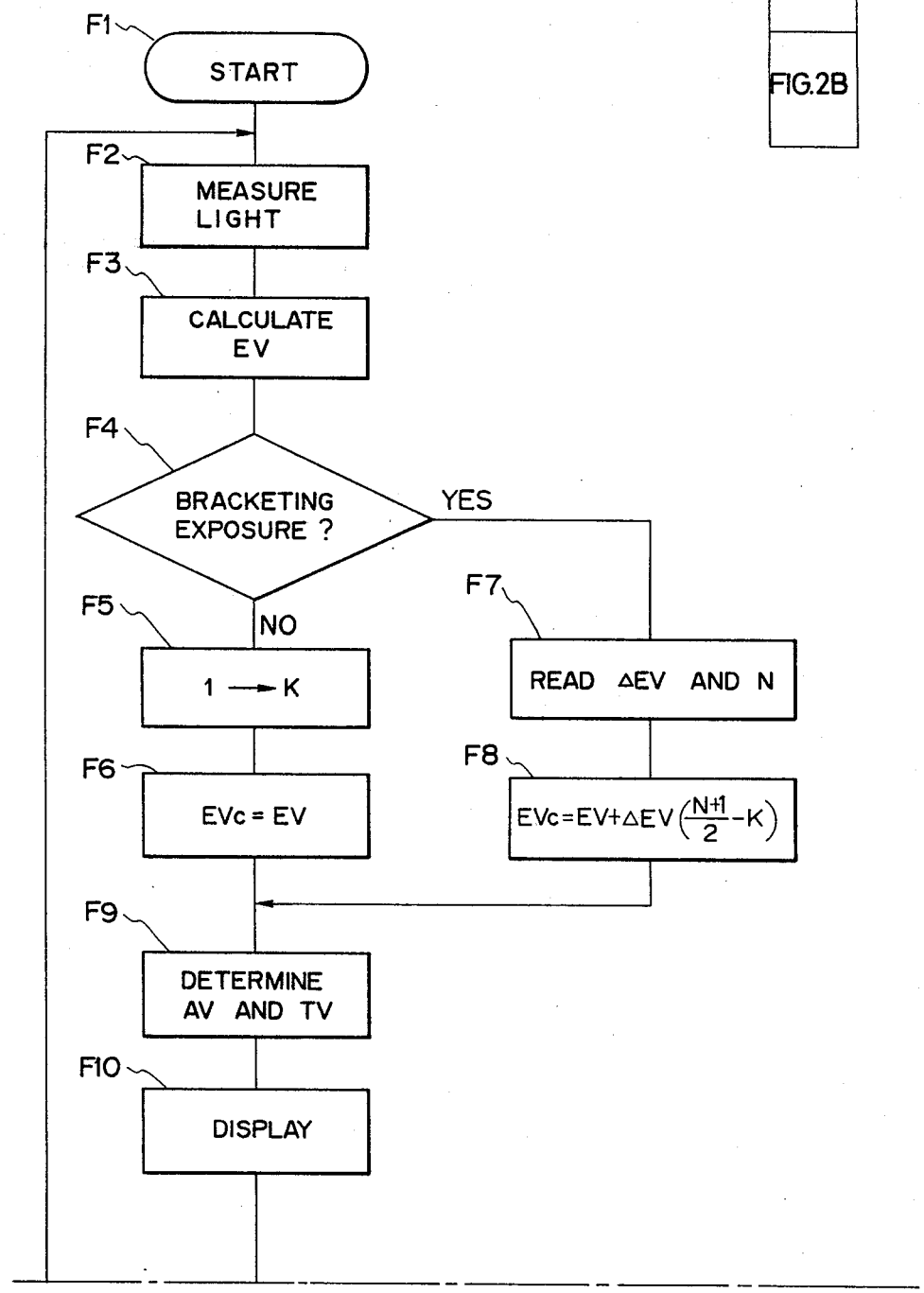

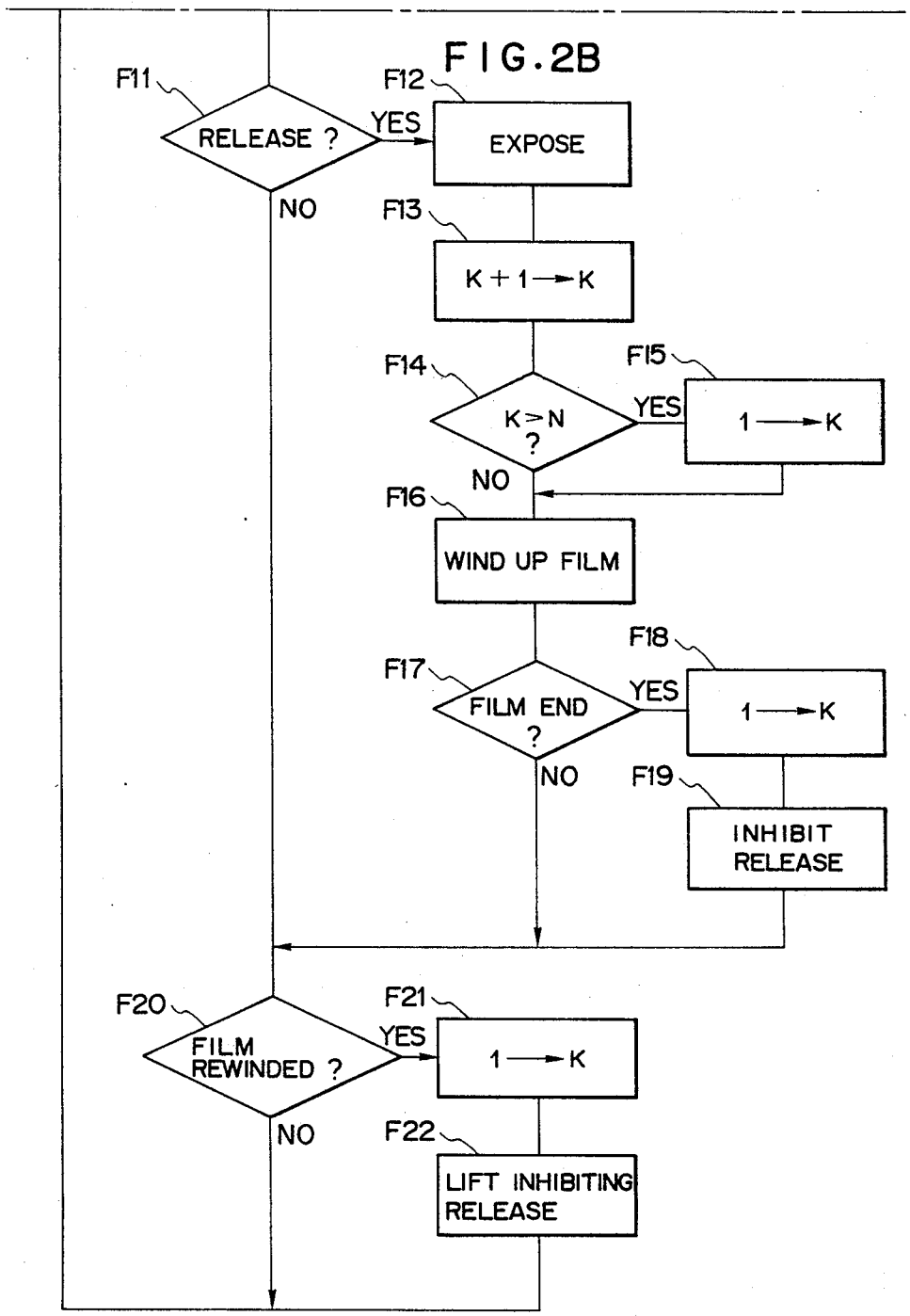

CAMERA CAPABLE OF BRACKETING EXPOSURE

BACKGROUND OF THE INVENTION

1. Field of the Invention

The present invention relates to a camera capable of bracketing exposure.

2. Related Background Art

The object of the bracketing exposure is to expose at an optimum exposure value an object whose brightness or lightness cannot be corrected by an automatic exposure system or expose the object at an optimum exposure value by compensating for variations in film speed. Therefore, in the conventional cameras capable of bracketing exposure, the difference in exposure value setting is ±0.5 or ±1.0 at the most.

In the case of bracketing exposure, it is preferable to continuously expose a predetermined number of exposures of the object by a single shutter release. Therefore, the conventional main bracketing exposure procedure is such that in response to one actuation operation (that is, one depression of a shutter release button), the total of three pictures are obtained by changing the exposure values; that is, the first picture is exposed at a suitable exposure value determined by a camera; the second picture is exposed by stepping an exposure value by one step on the negative side; and the third picture is exposed by stepping an exposure value by one step on the positive side.

Since the bracketing exposure is utilized to attain the above described objects, in general means for setting the bracketing exposure is so designed and constructed that the bracketing exposure mode is terminated every time when one bracketing exposure has been accomplished and every time when a photographer judges that the bracketing exposure is necessary, he/she sets the camera into the bracketing exposure mode again.

In the case of the bracketing exposure under the above-described conditions, when the last frame of a film has been exposure, the bracketing exposure mode is stopped by disregarding the remaining frames even when one or more pictures for bracketing exposure are remained.

However, recently the expression of picture is diversified so that it does not suffice to a photographic picture which was photographed at an optimum exposure value when judged objectively. It follows therefore that there has been proposed a camera with the bracketing function that the difference in exposure value steps as well as the total number of frames to be exposed by stepping the exposure values can be increased so that the object whose exposure cannot be uniquely determined in the case of an exposure can be exposed at various exposure values determined by taking into consideration of the exposure values subjunctively determined by a photographer. As to a shutter release chance, there has been a demand for the function or mode in which even in the case of a fundamentally same object, each frame is defined or confirmed and then exposed. Therefore there has been proposed a camera which can be switched between the bracketing exposure mode in which a predetermined number of exposures can be continuously made only by depressing a shutter release button only once and the individual exposure mode in which each exposure is made every time when the shutter release button is depressed. The camera of the type just described above is used in many case in order to positively enjoy the pictures photographed by the bracketing exposure mode rather than to obtain a picture as a precise record. As a result, it becomes cumbersome for a photographer when the bracketing exposure mode is stopped every time when one bracket exposure mode has been accomplished. Furthermore, in the case of the bracketing exposure mode which permits a relatively large number of exposures, the possibility that, during the bracketing exposure mode, the last frame of a film is exposed prior to the termination of the bracketing exposure mode, becomes high. Therefore there arises the problem that when the bracketing exposure mode cannot be continued at the trailing end of a film, it becomes inconvenient for a photographer to reset the bracketing exposure mode again when the bracketing exposure mode is stopped at the end of the film.

SUMMARY OF THE INVENTION

In view of the above, the primary object of the present invention is to provide a camera which can restart the bracketing exposure mode even after all the frames of a film have been exposed during the bracketing exposure mode.

To the above and other ends, according to the present invention, an output derived from means for detecting the trailing end of a film is delivered to control means which controls the arithmetic operation for obtaining an optimum exposure value as well as the bracketing exposure mode so that in response to the above-stated output, the control means inhibits the shutter release after the end of the film, but maintains the bracketing exposure mode. Furthermore, the remaining exposures of a predetermined number of exposures in the bracketing exposure mode are cancelled at the end of the film.

According to the present invention, the bracketing exposure mode once set can be continued and even at the end of the film the bracketing exposure mode is not released so that the cumbersome setting of the bracketing exposure mode every time when the exposed film is replaced by a new film can be eliminated and consequently a photographer can devote his/her effort only to the framing operation, thereby fully utilizing various desired effects of the bracketing exposure mode.

BRIEF DESCRIPTION OF THE DRAWINGS

FIG. 2, consisting of FIGS. 2A and 2B, is a flowchart illustrating the control procedure accomplished by control means 1.

DETAILED DESCRIPTION OF THE PREFERRED EMBODIMENT

Figure 1:
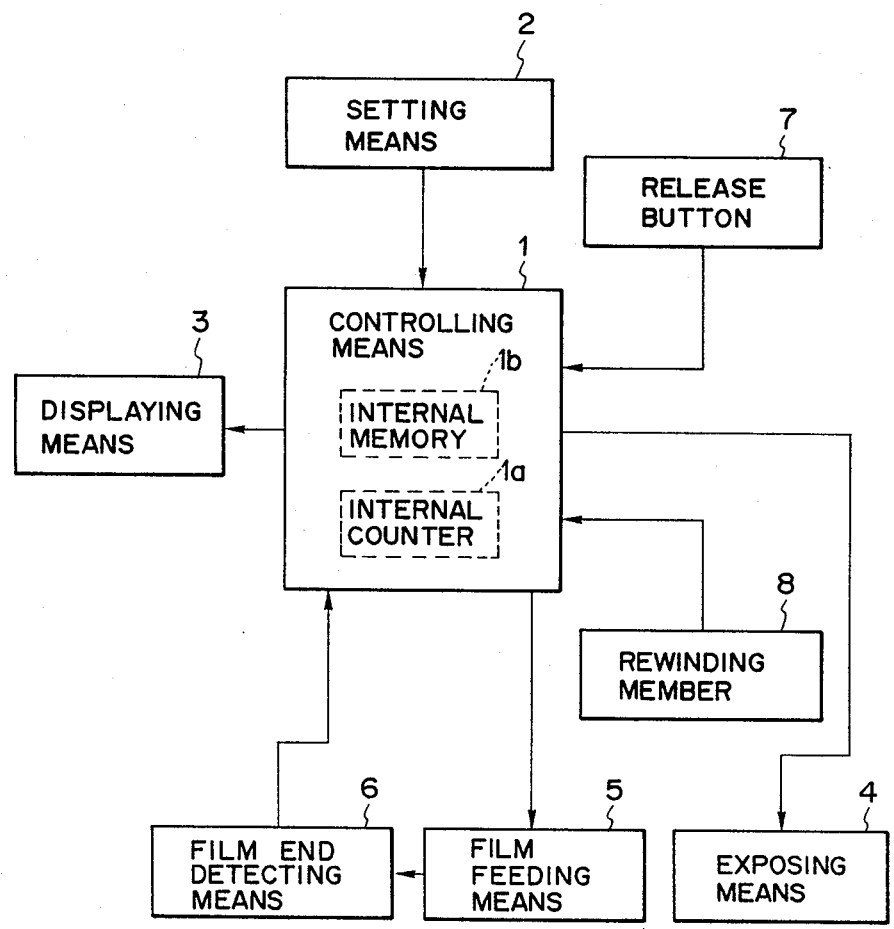
FIG. 1 is a block diagram illustrating the construction of a preferred embodiment of the present invention.

Referring first to FIG. 1 illustrating a preferred embodiment of the present invention, the construction thereof will be described in detail hereinafter.

The preferred embodiment of the present invention comprises control means 1 for controlling the fundamental functions of a camera; setting means for setting the camera in the bracketing exposure mode, the difference in exposure value steps and a parameter of all the frames to be exposed; display means 3 for displaying an exposure value and so on; exposure means 4; film feeding means 5 for winding and rewinding a film; and film end detecting means. Data set by the setting means 2 are delivered to the control means 1 which in turn delivers display data to the display means 3 and controls the operation of the exposure means. In response to a control signal, the film feeding means is controlled to wind a film from a cartridge thereof. In response to an output of the film feeding means, the means 6 detects the end of the unrolled film and delivers a signal representative of the end of the unrolled film to the control means.

Referring next to the flowchart illustrated in FIG. 1, the mode of operation of the preferred embodiment will be described in detail hereinafter.

When the control means 1 comprising a microcomputer or the like is connected to a power supply (not shown), the procedure illustrated in the flowchart shown in FIG. 2 is started. First at F2 in FIG. 2, the brightness or lightness of an object to be photographed is measured and at F3 various parameters are received from a film speed setting device and so on (not shown) and the arithmetic operation is carried out to obtain an exposure value EV to be controlled. At F4 it is detected whether or not the data delivered from the setting means includes the data for setting the camera in the bracketing exposure mode. If the data for setting the camera in the bracketing exposure mode is not detected, the control procedure advances to F5 which the initial value 1 is entered into a counter K which counts a number of exposures made by the bracketing exposure mode. The counter K is an internal counter 1a incorporated in the control means 1. It must be pointed out here that the setting of the initial value is accomplished so that when the bracketing exposure mode is stopped at F18 and F21, always the bracket exposure mode is started from the first frame when the camera is set into the bracket exposure mode again. Next at F6 an exposure value EVc which is actually controlled is set equal to an exposure value EV obtained at F3. Meanwhile, when the setting of the bracketing exposure mode is detected at F4, the control procedure advances to at F7 in which a difference in exposure value step for each frame and the total number of exposures made by the bracketing exposure mode both of which are set by the setting means 2 are read in and the exposure value steps ΔEV and the set total number N of exposures made by the bracketing exposure mode are stored in an internal memory 1b incorporated in the control means 1. The setting means 2 is so designed and constructed in such a way that the total number N becomes an odd number. At F8, a control exposure value EVc corresponding to the K-th frame of the whole frame is computed by the following equation:

$$EVc = EV = \Delta EV \left( \frac{N+1}{2} - K \right)$$

According to the above-described procedure, the bracketing exposures are sequentially made in the order of exposure values starting from the highest exposure value.

At F9 a controlled shutter speed TV and controlled diaphragm are determined on the basis of the control exposure value EVc determined at F6 or F8 and exposure mode setting data (the shutter release priority mode, the aperture priority mode, the program mode and so on), and the determined shutter speed and the determined diaphragm in turn are delivered as the data to the display means 3 at F10.

At F11 it is detected whether the shutter release button 7 which means for actuating the shutter release is depressed. When the shutter is to be released, the exposure is controlled by the exposure means 4 at F12 and at F13 the counter K is incremented by 1. At F14, it is detected whether or not the content in the counter K is in excess of the set number N of exposures by bracketing exposure mode. When it is detected that the content is in excess of the set number N; that is, when a series of bracketing exposures has been accomplished by the depression of the shutter release button at this time, the content in the counter K is reset to the initial value 1 at F15. On the other hand, the content is the counter K is not in excess of the set number N, the control procedure advances from F14 to F16 in which the film is advanced by the film feeding means 5 and at F17 it is checked whether or not the end of the film is detected by the film end detecting means 6. When the end of the film is detected, the counter K is reset to the initial value 1 at F18 and, the shutter release is inhibited at F19. Resetting the counter K to the initial value 1 means that at the end of the film the bracketing exposure mode is cancelled and that when the shutter release button is depressed . next time, the bracketing exposure mode is set to expose from the first frame.

At F20 it is detected whether or not the rewinding of the film is carried out by a rewinding member 8. When the rewinding operation is carried out by the rewinding member 8, at F21 the counter K is reset to the initial value 1 and at F22 the shutter release inhibition is lifted. More specifically at F20 it is detected whether or not the rewinding member 8 is activated. Therefore even after the film has been rewound, it becomes possible to depress the shutter release button and thereafter the control procedure returns to F2, whereby the main loop is defined.

Referring next to TABLE 1 and TABLE 2, the mode of operation in practice when a roll of film is loaded into the camera will be described based on the above-described control procedure. Table 1 shows the frame numbers in the vicinity of the end of first film and their exposure values, while TABLE 2 shows the frame numbers starting from the leading edge of second film and their exposure values. The exposure mode is the aperture priority mode; the optimum exposure of a field to be photographed is F 5.6 and 1/250 sec; the bracketing exposure mode is so set that one exposure difference step is changed per frame; and the total number of exposures made by the bracketing exposure mode is five. First a series of bracket exposures is started from the first film; that is, the 30-th frame and only the shutter speed is changed by one step per frame from 1/1000 sec. and the last frame; that is, the 35-th frame is exposed at the shutter speed of 1/60. Thus one series of bracketing exposures is accomplished. Thereafter the next series of bracketing exposures is started from the 35-th frame in a manner substantially similar to that described above, but after the exposure of the 36-th frame, the film ends leaving three frames unexposed. Then the exposure value EV setting is returned to that for the first frame of a series of bracketing exposures, but the shutter release is inhibited until the film rewinding operation is accomplished. After the completion of the exposed film rewinding, a new film is loaded into the camera and when the first frame is advanced and set at a predetermined exposure position, an exposure value EV is set at the shutter speed of 1/1000 sec. for the first frame exposed by the bracketing exposure mode and it becomes possible to continue the next series of bracketing exposures.

TABLE 2

| Frame number | Shutter speed | Diaphragm |
| --- | --- | --- |
| 1st frame | 1/1000 sec. | F5.6 |
| 2 | 1/500 | F5.6 |
| 3 | 1/250 | F5.6 |
| 4 | 1/125 | F5.6 |
| 5 | 1/60 | F5.6 |
| 6 | 1/1000 | F5.6 |
| 7 | 1/500 | F5.6 |
| 8 | 1/125 | F5.6 |
| . | | |
| . | | |
| . | | |

TABLE 1

| Frame number | Shutter speed | Diaphragm |
| --- | --- | --- |
| . | | |
| . | | |
| . | | |
| 30th frame | 1/1000 sec. | F5.6 |
| 31 | 1/500 | F5.6 |
| 32 | 1/250 | F5.6 |
| 33 | 1/125 | F5.6 |
| 34 | 1/60 | F5.6 |
| 35 | 1/1000 | F5.6 |
| 36 | 1/500 | F5.6 |
| 32 | Detection of the end of the film/exposure impossible | |

We claim:

1. A camera comprising:
   (a) exposure means for exposing a film;
   (b) film feeding means for winding up the film from a cartridge in which is loaded the film having a predetermined number of frames to be exposed;
   (c) setting means for setting a number of frames to be exposed in the bracketing exposure mode;
   (d) bracketing control means for controlling said exposure means and said film feeding means in such a way that exposure values are changed for each frame of a number of frames set by said setting means when said set number of frames are exposed, said bracketing control means having counter means for counting the number of frames exposed in the bracketing exposure mode, said bracketing control means comparing the content in said counter means with said set number of frames; and
   (e) detection means for detecting that said feeding means has wound up from said cartridge the film having said predetermined number of frames, and thereafter generating a detection signal;
   (f) said bracketing control means resetting said counter means in response to said detection signal.

2. A camera as set forth in claim 1, wherein in the bracketing exposure mode said setting means set a difference exposure value, and wherein said bracketing control means computes the exposure values of said set number of frames in the bracketing exposure mode based upon said set number of frames, said difference exposure value and the content in said counter means, and controls said exposure means on the basis of said computed exposure value so that the exposure values of said set number of frames changes by said difference exposure value.

3. A camera as set forth in claim 1, wherein said film feeding means is so designed and constructed to rewind the exposed film into the cartridge, and wherein said bracketing control means resets said counter means when said film feeding means rewinds said exposed film into the cartridge.

4. A camera as set forth in claim 3 further comprising an operating member for being operated so that said film feeding rewinds said exposed film into the cartridge, and wherein said bracketing means resets said counter means in response to the operation of said operating member.

5. A camera as set forth in claim 1, wherein said counter means counts the frames every time when one exposure is made in the bracketing exposure mode.

6. A camera as set forth in claim 1 further comprising display means for displaying in response to the content in said counter means.

7. A camera comprising:
   (a) exposure means for exposing a film;
   (b) film feeding means for winding up the film from a cartridge in which is loaded the film having a predetermined number of frames to be exposed, and rewinding the exposed film back into the cartridge.
   (c) setting means for setting a number of frames of the film to be exposed with respect to the bracketing exposure mode; and
   (d) bracketing control means for controlling said exposure means and said film feeding means in such a way that exposure values are changed for each frame of said set number of frames set by said setting means when said set number of frames are exposed, said bracketing control means having counter means for counting the number of frames exposed in the bracketing exposure mode, said bracketing control means comparing the content of said counter means with said set number of frames set by setting means;
   (e) said bracketing control means initializing said counter means when said film feeding means has rewound the film back into said cartridge.

8. A camera as set forth in claim 7, wherein said setting means set a difference exposure value, wherein said bracketing control means computes the exposure values of said set number of frames in the bracketing exposure mode based upon said set number of frames, said difference exposure value and the content in said counter means, and controls said exposure means on the basis of said computed exposure value so that the exposure values of said set number of frames changes by said difference exposure value.

9. A camera as set forth in claim 7 further comprising an operating member for being operated so that said film feeding rewinds said exposed film into the cartridge, and wherein said bracketing means resets said counter means in response to the operation of said operating means.

10. A camera comprising:
    (a) exposuring means for exposing a film;
    (b) film feeding means for winding up the film from a cartridge in which is loaded the film having a predetermined frames to be exposed;
    (c) setting means for setting a number of frames to be exposed in the bracketing exposure mode;
    (d) bracketing control means for controlling said exposure means and said film feeding means in such a way that exposure values are changed for each frame of the set number of frames set by said setting means when the set number of frames are exposed, said bracketing control means having counter means for counting the number of exposed frames in the bracketing exposure mode, said bracketing control means comparing the content in said counter means with the number of frames predetermined by said setting means; and (e) detecting means for detecting that said rewinding means has rewound the film having said predetermined number of frames from said cartridge and generating a detection signal;

(f) said bracketing control means resetting said counter means in response to said detection signal.

11. A camera as set forth in claim 10, wherein said setting means set a difference exposure value in the bracketing exposure mode, and wherein said bracketing control means computes the exposure values of said set number of frames in the bracketing exposure mode based on said set number of frames, said difference exposure value and the content in said counter means, and controls said exposure means in response to said computed exposure value so that the exposure values of said set number of frames changes by said difference exposure value.

12. A camera comprising:
(a) exposure means for exposing a film;
(b) film feeding means for winding up the film having a predetermined number of frames to be exposed from a cartridge into which is loaded the film and rewinding the exposed film back into said cartridge;
(c) setting means for setting a set number of frames to be exposed in the bracketing exposure mode; and
(d) bracketing control means for controlling said exposure means and said feeding means in the case of exposure of the set number of frames set by said setting means in such a way that exposure values are changed for each frame of the set number of frames, said bracketing control means having counter means for counting the number of frames exposed in the bracketing exposure mode;
(e) said bracketing control means resetting said counter means when said film feed means rewinds the exposed film back into said cartridge.

13. A camera as set forth in claim 12, wherein said setting means set a difference exposure value in the bracketing exposure mode, and wherein said bracketing control means computes the exposure values of said set number of frames in the bracketing exposure mode based on said set number of frames and said difference exposure value set and controls said exposure means in response to said computed exposure value so that the exposure values of said set number of frames changes by said difference exposure value.

* * * * *